United States Patent [19]

Crotti et al.

[11] 4,090,799
[45] May 23, 1978

[54] MITER JOINT FOR HOLLOW PLASTIC FRAME MEMBERS

[75] Inventors: Giacomo Crotti, Occhiobello (Rovigo); Erminio Diolaiti, S. Lazzaro di Savena (Bologna), both of Italy

[73] Assignees: Color-Plast S.p.A., Rovigo; Generale Ultrasuoni S.p.A., Bologna, both of Italy

[21] Appl. No.: 734,623

[22] Filed: Oct. 21, 1976

[30] Foreign Application Priority Data

Oct. 21, 1975  Italy ........................... 64508 A/75

[51] Int. Cl.² ........................... B25G 3/36; F16B 2/20
[52] U.S. Cl. ........................... 403/401; 403/231; 40/152; 52/656
[58] Field of Search ............ 403/231, 270, 295, 401, 403/402, 406; 52/656, 657, 475; 228/110; 156/73.1; 40/125 H, 152 R

[56] References Cited

U.S. PATENT DOCUMENTS

| | | | |
|---|---|---|---|
| 3,459,610 | 8/1969 | Dijkers et al. | 228/110 X |
| 3,510,985 | 5/1970 | Smits | 403/295 X |
| 3,853,671 | 12/1974 | Ausnit | 156/73.1 X |

FOREIGN PATENT DOCUMENTS

2,300,281  7/1974  Germany ........................... 52/475

OTHER PUBLICATIONS

"Ultrasonic News", published by Branson Sonic Power Co., Feb. 1973.

*Primary Examiner*—Wayne L. Shedd
*Attorney, Agent, or Firm*—Browdy and Neimark

[57] ABSTRACT

An angular connection for a frame or counterframe composed of hollow sections of plastic material includes at least one plastic angular element inserted with its two legs fitting firmly in the hollow sections at the point at which they converge. The walls of the sections are welded to the legs of the insert by ultrasonic spot welds. A second plastic insert may be provided for connecting together edges of the sections, the first plastic insert being arranged to connect the main bodies of the sections together. Both inserts are connected to the hollow sections by ultrasonic spot welds. A method of making an angular connection for a frame and counterframe includes the step of welding hollow sections to at least one plastic angular element using ultrasonic welding techniques.

6 Claims, 7 Drawing Figures

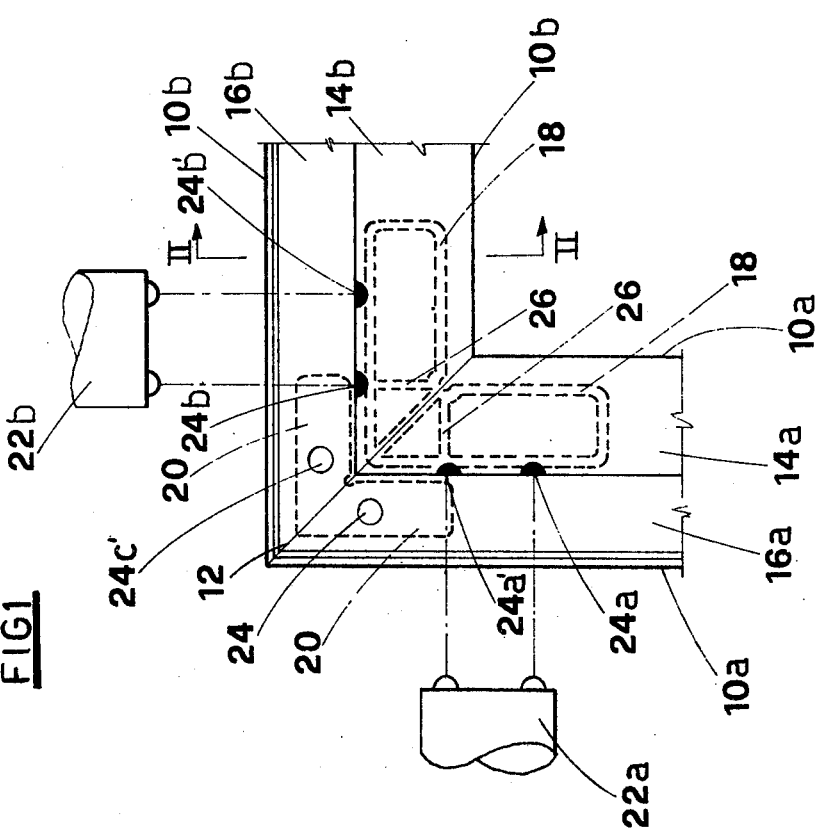

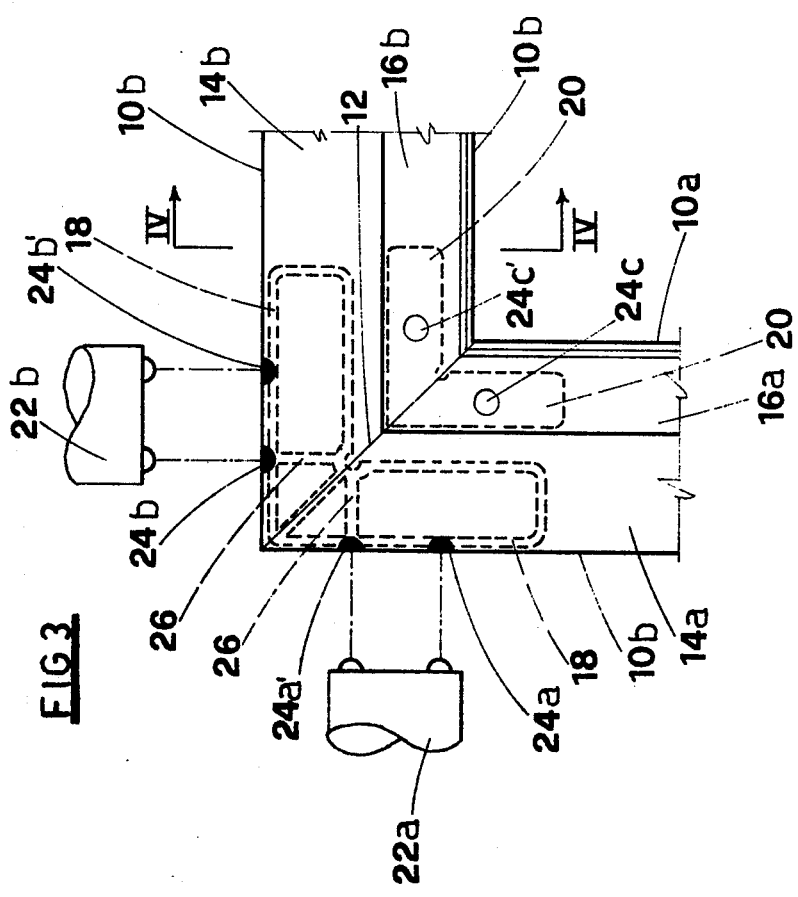

MITER JOINT FOR HOLLOW PLASTIC FRAME MEMBERS

BACKGROUND OF THE INVENTION

The present invention relates to an angular connection for frames and counterframes formed of hollow plastic sections.

The invention also relates to a process for producing such a connection, based essentially on welding by the ultrasonic technique.

In the description hereinbelow, frames and counterframes are understood to be both sashes and countersashes for inside and ourside frames, and framework of any other kind, provided it is made of plastic hollow sections.

In the manufacture of sashes made of hollow plastic sections, there is a problem involving the angle connection.

For this purpose, it is usual to assemble sections cut at 45° by welding the edges in the vicinity of the angle or by force-fitting angular elements into the interiors of the sections converging in the vicinity of this angle.

In the latter case, adhesives or self-tapping screws are also used to ensure a better grip.

These known methods are not entirely satisfactory.

Thus, for example, it is usually difficult to operate with the desired precision when welding the edges of the sections, and the use of screws can impair the mechanical characteristics of the sash thus produced.

In any event, when known techniques are used, there are disadvantages deriving both from the large number and difficulty of the operations and from the time required for such operations.

Consequently, the rate of production is low and the cost is high.

Finally, the machinery used to manufacture such sashes is often complex.

SUMMARY OF THE INVENTION

According to the present invention, the disadvantages of prior art are eliminated or at least greatly reduced through the adoption of a particular angle connector in frames made of plastic.

One object of the present invention is to provide an angle connector for a frame or counterframe formed of hollow plastic sections.

Another object of the present invention is to provide a method of making such a connector.

Other objects of the invention are to become clear from the description hereinbelow.

The angle connection of the present invention includes at least one plastic angular element with its legs firmly inserted in the hollow sections converging at this connection, the walls of the sections being welded to said legs by ultrasonic spot welds.

At least one ultrasonic spot weld is applied to the wall of the section corresponding to each of the two legs of the angular element.

The hollow sections, suited for the purposes of the present invention, are made of thermoplastic material, preferably polyvinylchloride, especially rigid polyvinylchloride. The sections can be produced by the usual techniques of extrusion, and the thickness of the walls of the sections can vary over a broad range from about 1 to 7 mm.

The angular elements used for the purposes of the present invention are also made of thermoplastic material, preferably rigid polyvinylchloride.

These elements are shaped like a solid or hollow letter "L" and can be produced by stamping or drawing.

In the latter case a continuous product is obtained, cut into angular elements of the desired thickness.

In the case of hollow elements, the thickness of the walls can be about 1 to 7 mm.

The preferred section for the purposes of the present invention comprises a hollow main body and a hollow edge, the latter acting as a shoulder.

In this case the connection of the present invention has two plastic angular elements connecting the bodies and the edges of the sections, respectively.

In this case the ultrasonic spot welds are applied to the outside perimetric surface of the bodies of the sections constituting the sash (or countersash) in correspondence with the legs of the plastic angular element connecting said section bodies. At least one ultrasonic spot weld is applied corresponding to each of the two legs of the angular element.

The maximum number of ultrasonic welds applied to each leg is not critical, but it has been found that no great advantages are to be obtained by raising the number above 4 to 5.

According to a preferred embodiment of the present invention, ultrasonic spot welds are also applied to the shoulders of the edges of the sections constituting the sash (or countersash) in correspondence with each of the two legs of the plastic angular element connecting said section edges.

Usually, a single ultrasonic spot weld applied in correspondence with each of the two legs of the angular element is sufficient for the purpose.

The ultrasonic spot welds can be applied by known ultrasonic welding devices which have essentially a high-frequency electrical source (generally about 20 KHz), a transducer transforming the electrical energy into mechanical energy (vibration) and a device (resonator or sonotrode) amplifying the vibrations and transmitting them through the tips to the materials to be welded. Moreover, the "contact" technique is employed with welding times from 5-30 seconds (typically on the order of 15 sec), with perhaps a pressure being exerted through the sonotrode on the material to be welded, which pressure may be as high as several $kg/cm^2$. The sonotrode can have one or more welding tips and these tips can have flat or hemispherical or substantially hemispherical ends, but in any case are such as to ultrasonic create welds, each covering an area of 4–100 $mm^2$.

In the preferred embodiment, sonotrodes with hemispherical tips are used, and, during ultrasonic welding, a pressure is exerted on the material to be welded so as to cause penetration of the sonotrode tips up to a few millimeters into the surface of the angular element inserted in the hollow section.

Such a procedure ensures optimal retention because, in addition to the welding effect from fusion of the plastic material, there is a squeezing action exerted on the angular element by the effect of the fused material spilling over and creating resistance against the section due to the deformation caused in the wall of the section and in the corresponding area of the angular element inserted in said section.

Such a weld, or "boss", generally has a diameter on the order of 2–10 mm and a depth on the order of 3–7 mm.

It should be noted that the bosses impressed in the frame or counterframe do not compromise its aesthetic appearance.

In fact, the bosses produced on the outside perimetric wall of the body of the section constituting the counterframe are invisible in that they are hidden by the perimetric wall into which said counterframe is inserted, while analogous bosses impressed on the body of the sash remain hidden behind the corresponding walls of the sash and countersash.

In addition, the bosses impressed on the edges of the sections remain hidden behind the corresponding shoulder surfaces.

BRIEF DESCRIPTION OF THE DRAWINGS

The invention is now be described with reference to the attached figures which represent a nonlimitative embodiment of the present invention.

In particular:

FIG. 1 represents the angular connection between two hollow sections in a frame;

FIG. 2 represents a view of FIG. 1 along section II—II;

FIG. 3 represents the angular connection between two hollow sections in a counterframe;

FIG. 4 represents a view of FIG. 3 along section IV—IV;

DETAILED DESCRIPTION OF THE PREFERRED EMBODIMENTS

Figure 5:
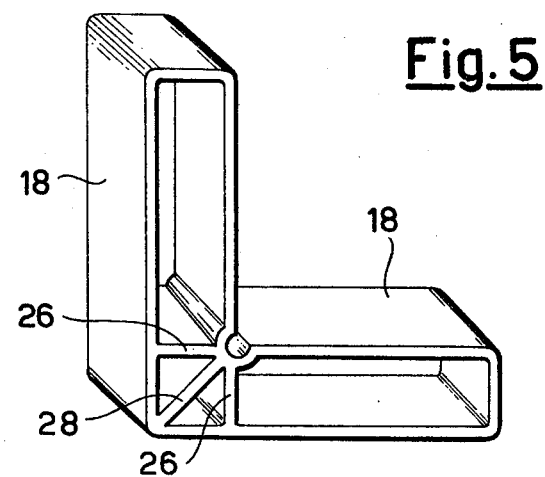
FIG. 5 shows the angular element connecting the bodies of the hollow sections.

FIG. 5 shows angular element 18 in the shape of a hollow "L" suitable for connecting the bodies of the hollow sections.

The element 18 is made of plastic and is provided internally with two partitions 26 connecting the short walls with the long walls of said "L".

A reinforcing partition 28 is also provided.

The wall of angular element 18 and the partitions 26, 28 associated therewith have thicknesses typically on the order of 1–7 mm.

Figure 6:
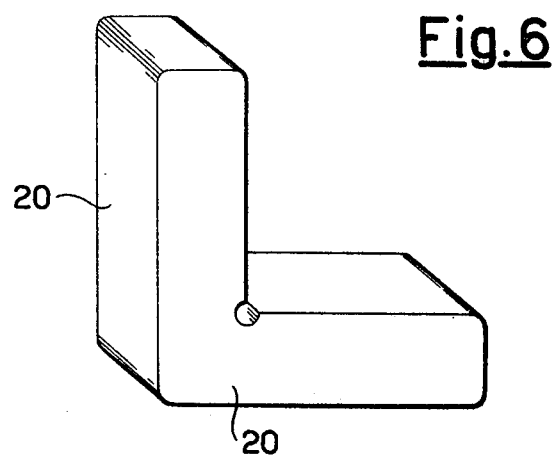
FIG. 6 shows the angular element connecting the edges of the hollow sections.
Figure 7:
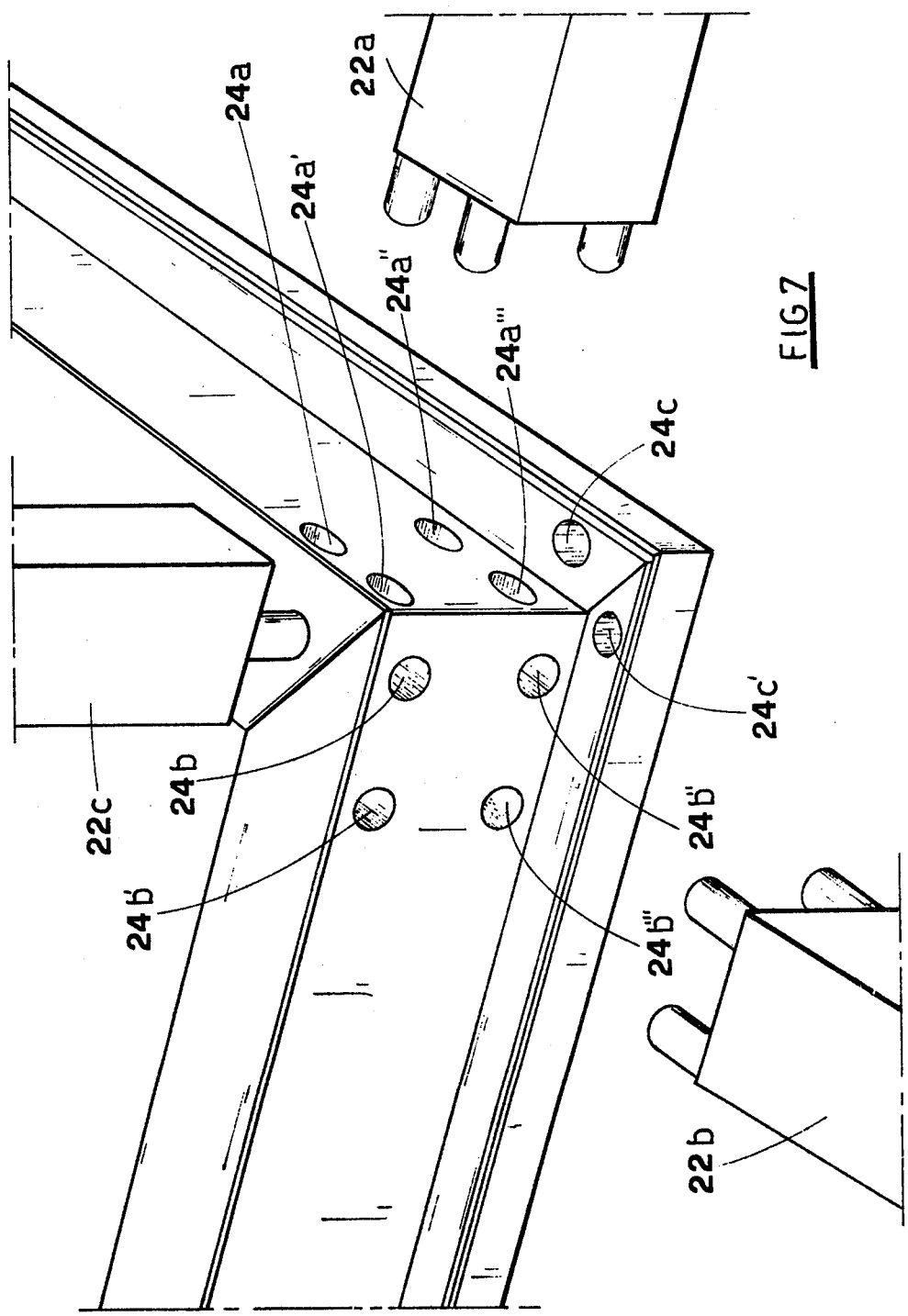
FIG. 7 particularly shows the sonotrodes and welding tips applied to the bodies and edges of the sections forming the connection in FIG. 1.

FIG. 6 shows angular element 20 of plastic, shaped like a solid "L", suitable for connecting the edges of the hollow sections.

Referring now to FIGS. 1, 2 and 7, 10a and 10b indicate the hollow sections converging on a junction line 12.

The hollow section 10a is formed from a hollow body 14a and a hollow edge 16a and hollow section 10b is formed from a hollow body 14b and hollow edge 16b.

Plastic angular element 18 (described in relation to FIG. 5) connects the hollow bodies 14a and 14b which belong are associated respectively with the sections 10a and 10b. The plastic angular element 20 described in relation to FIG. 6 connects hollow edges 16a and 16b which are associated respectively to sections 10a and 10b. A sonotode 22a is provided with four hemispherical tips, which sonotrode is able to apply boss-like spot welds 24a, 24a', 24a" and 24a''' to the outside perimetric surface of the body 14a of the section 10a corresponding to one leg of hollow angular element 18. FIG. 1 shows a preferred embodiment in which the two spot welds 24a' and 24a''' are applied in correspondence with a partition 26 of the hollow angular element 18.

Obviously, if desired, another partition can be provided in the hollow angular element 18 in correspondence with the spot welds 24a and 24a".

A sonotrode is provided with four hemispherical tips, which sonotrode is able to apply spot welds 24b, 24b', 24b", and 24b''' to the outside perimetric surface of the body 14b of the section 10b in correspondence with the other leg of hollow angular element 18.

Another variant is shown in which the two spot welds 24b and 24b" are applied in correspondence with the other partition 26 of the hollow angular element 18.

Obviously, another partition could be provided in the hollow angular element 18 in correspondence with the welds 24b' and 24b".

A sonotrode 22c provided with two hemispherical tips able to impress spot welds 24c and 24c' respectively onto the shoulder of the edge 16a of the section 10a and the edge 16b of the section 10b.

The spot welds 24c and 24c' are applied in the vicinity of the junction line 12 in correspondence with the angular element 20.

FIGS. 3 and 4 represent the angular connection in a counterframe and the numbers therein have the same significance as in the other figures illustrated.

The relative advatages of the present invention consist in the short manufacturing time and simplicity of operation, as well as the extreme precision with which the products are manufactured. The angular connections described above also have high mechanical strength, especially when bosses are applied.

Another advantage of the present invention consists in the possibility of making all the welds relative to one sash angle using ultrasonic welding apparatus provided with several welding heads.

We claim:

1. An angular connection for a frame or counterframe composed of converging hollow sections of plastic material, the connection comprising at least one plastic angular element having legs, said legs being inserted and fitting firmly in respective ones of said converging sections. walls of said sections being welded to said legs by ultrasonic spot welds, wherein said plastic angular element connecting said bodies of said sections is in the shape of a hollow "L" having internal partitions connecting short walls with the long walls of said "L", and including at least one ultrasonic spot weld applied to the outside perimetric surface of said bodies of said sections in correspondence with said partitions.

2. An angular connection according to claim 1, wherein each of said sections has a hollow main body and a hollow edge acting as a shoulder, and wherein said at least one element comprises a first plastic angular and a second plastic angular element respectively connecting said bodies and said edges of said sections.

3. An angular connection according to claim 2, including at least one ultrasonic spot weld on the outside perimetric surfaces of said bodies of said sections in correspondence with each of said two legs of that one of said plastic angular elements connecting said two bodies of said sections.

4. An angular connection according to claim 3, including at least one ultrasonic spot weld on said shoulders of said edges of said sections in correspondence with each of said two legs of that one of said two plastic angular elements connecting said edges of said sections.

5. An angular connection according to claim 2, including at least one ultrasonic spot weld on said shoulders of said edges of said sections in correspondence with each of said two legs of that one of said two plastic angular elements connecting said edges of said sections.

6. An angular connection according to claim 2, wherein, said second plastic angular element connecting said edges of said sections is in the shape of a solid "L".

* * * * *